United States Patent
Son et al.

(10) Patent No.: US 12,252,562 B2
(45) Date of Patent: Mar. 18, 2025

(54) METHOD FOR PRODUCING ETHYLENE-ACRYLIC ACID COPOLYMER

(71) Applicants: SK Innovation Co., Ltd., Seoul (KR); SK Geo Centric Co., Ltd., Seoul (KR)

(72) Inventors: Sang Ha Son, Daejeon (KR); Wan Ju Jeong, Daejeon (KR); Doh Yeon Park, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 384 days.

(21) Appl. No.: 17/695,102

(22) Filed: Mar. 15, 2022

(65) Prior Publication Data

US 2022/0306778 A1 Sep. 29, 2022

(30) Foreign Application Priority Data

Mar. 24, 2021 (KR) .......................... 10-2021-0037948

(51) Int. Cl.
| | |
|---|---|
| C08F 220/06 | (2006.01) |
| B29C 48/00 | (2019.01) |
| B29C 48/05 | (2019.01) |
| C08F 210/02 | (2006.01) |
| B29K 23/00 | (2006.01) |
| B29L 31/00 | (2006.01) |

(52) U.S. Cl.
CPC .......... *C08F 210/02* (2013.01); *B29C 48/022* (2019.02); *B29C 48/05* (2019.02); *B29K 2023/08* (2013.01); *B29L 2031/731* (2013.01); *C08F 2800/20* (2013.01)

(58) Field of Classification Search
CPC .............................. C08F 220/06; B29C 48/05
See application file for complete search history.

(56) References Cited

U.S. PATENT DOCUMENTS

| | | | |
|---|---|---|---|
| 5,902,869 | A | 5/1999 | Chou |
| 2013/0184419 | A1 | 7/2013 | Berbee et al. |
| 2018/0134824 | A1 | 5/2018 | Eddy et al. |
| 2022/0242981 | A1 | 8/2022 | Aoki et al. |

FOREIGN PATENT DOCUMENTS

| | | |
|---|---|---|
| EP | 0888391 B1 | 7/2001 |
| KR | 100526961 B1 | 11/2005 |
| KR | 1020150065750 A | 6/2015 |
| KR | 101861878 B1 | 7/2018 |
| KR | 1020200064691 A | 6/2020 |
| KR | 1020200093445 A | 8/2020 |
| WO | 2020262482 A1 | 12/2020 |

*Primary Examiner* — Caixia Lu
(74) *Attorney, Agent, or Firm* — The Webb Law Firm

(57) ABSTRACT

A method for producing an ethylene-acrylic acid copolymer may minimize the neck-in phenomenon of the strand by discharging the copolymer strand by controlling the discharging temperature of the produced copolymer to be 200 to 300° C., has excellent workability, processability, and moldability, and melt index (MI) is easy to control. In addition, the ethylene-acrylic acid copolymer produced by this method has the effect of having high melt tension.

10 Claims, 1 Drawing Sheet

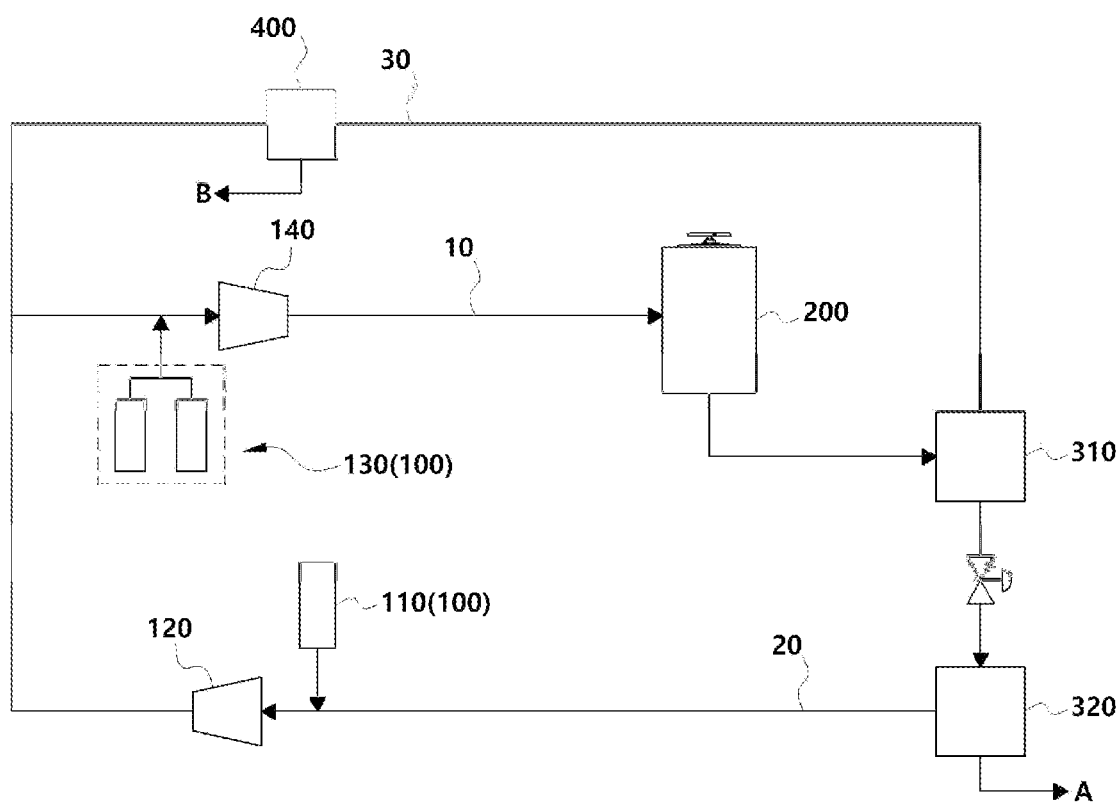

METHOD FOR PRODUCING ETHYLENE-ACRYLIC ACID COPOLYMER

CROSS-REFERENCE TO RELATED APPLICATION

This application claims priority to Korean Patent Application No. 10-2021-0037948 filed Mar. 24, 2021, the disclosure of which is hereby incorporated by reference in its entirety.

BACKGROUND OF THE INVENTION

Field of the Invention

The following disclosure relates to a method for producing an ethylene-acrylic acid copolymer, and more particularly, to a method for producing an ethylene-acrylic acid copolymer with a minimized neck-in phenomenon and improved workability and processability.

Description of Related Art

An ethylene-acrylic acid (EAA) copolymer has been used in various fields as a high value-added chemical product, and has been mainly used as a functional adhesive resin, for example, as an adhesive for thin packaging materials such as milk packs and aluminum foils of detergents.

Such an ethylene-acrylic acid copolymer requires high-pressure facilities in a production process and advanced technology such as product production at high acidity. For example, the copolymerization of an ethylene monomer and a carboxylic acid monomer uses a high pressure free radical copolymerization system, and specifically, is carried out through an autoclave reactor or a tubular reactor.

An ethylene-acrylic acid copolymer adhesive requires not only excellent workability and processability, but also high adhesive properties and particularly high melt tension. Specifically, deterioration in workability, processability, and moldability may be caused in the production of a polymer, and particularly, the neck-in phenomenon may be a major problem in the production of an ethylene-acrylic acid copolymer. The neck-in phenomenon causes shrinkage at a side end of the discharge when a strand or film manufactured by polymerizing the monomer is discharged and a difference between a die width and a discharge width occurs, resulting in a decrease in workability, processability, and moldability. In addition, in general, in the production of the ethylene-based copolymer in which an ethylene monomer and other comonomers are polymerized, when a high melt tension is required, especially under the condition that a higher melt tension is required, in reality, there was only a method of replacing the comonomer with another comonomer. Therefore, conventionally, no particular solution for increasing the melt tension of the ethylene-acrylic acid copolymer has been proposed.

As described above, in the production of the ethylene-acrylic acid copolymer, there were clearly limitations in improving melt tension, workability, and moldability. Thus, an object of the present invention is to provide an ethylene-acrylic acid copolymer having high melt tension and improved workability, processability, and moldability.

RELATED ART DOCUMENTS

Patent Documents (Patent Document 0001) Korean Patent Publication No. 10-1861878 (registered on May 21, 2018)

SUMMARY OF THE INVENTION

An embodiment of the present invention is directed to providing a method for producing an ethylene-acrylic acid copolymer capable of minimizing neck-in phenomenon and having excellent workability, processability, and moldability.

Another embodiment of the present disclosure is directed to providing a method for producing an ethylene-acrylic acid copolymer having high melt tension.

Another embodiment of the present disclosure is directed to providing a method for producing an ethylene-acrylic acid copolymer with easy adjustment of a melt index (MI).

In one general aspect, a method for producing an ethylene-acrylic acid copolymer includes: a polymerization step of preparing an ethylene-acrylic acid copolymer by copolymerizing an ethylene monomer and an acrylic acid comonomer; and a discharging step of discharging the ethylene-acrylic acid copolymer to obtain a strand, wherein in the discharging step, a discharging temperature of the strand is controlled to be 200 to 300° C.

In the discharging step, the residence time of the strand may be 5 to 60 seconds.

In the discharging step, the carboxyl groups in the discharged strand may be dehydrated to form an anhydride structure.

The strand may have an acrylic acid content of 1 to 30% by weight.

The strand may have a weight average molecular weight/number average molecular weight ($M_w/M_n$) of 4.5 to 15.

In the polymerization step, a polymerization temperature and a polymerization pressure may be 150 to 350° C. and 1,000 to 5,000 bar, respectively.

In the polymerization step, polymerization may be carried out by an initiator mixed solution containing a radical initiator and a dilution solvent, and the dilution solvent may be Isopar-H.

In the discharging step, the strand obtained by discharging may have a melt tension (Gottfert Rheotens, 160° C., ASTM D1238-E) of 120 to 200 mN.

In the discharging step, the strand obtained by discharging may have a melt index (190° C./2.16 kg, ASTM D 1238) of 5 to 15.

In the discharging step, the strand obtained by discharging may have a neck-in (draw down speed of 440 feet/min) of 3.3 inches or less.

The method for producing an ethylene-acrylic acid copolymer according to the present invention may minimize the neck-in phenomenon of the produced copolymer molded article, and has excellent workability, processability, and moldability.

In addition, the method for producing an ethylene-acrylic acid copolymer according to the present invention has an effect of easy adjustment of the melt index (MI) of the copolymer, and the ethylene-acrylic acid copolymer has an effect of having high melt tension.

BRIEF DESCRIPTION OF THE DRAWING

FIG. 1 is a view showing a producing process diagram of an ethylene-acrylic acid copolymer according to an embodiment of the present invention.

DESCRIPTION OF THE INVENTION

Hereinafter, a method for producing an ethylene-acrylic acid copolymer according to the present invention will be described in detail with reference to the accompanying drawings.

The drawings described in this specification are provided as examples so that the spirit of the present invention can be sufficiently transferred to those skilled in the art. Therefore, the present invention is not limited to the accompanying drawings provided and may be embodied in other forms. In addition, the accompanying drawings suggested below will be exaggerated in order to clarify the spirit of the present invention.

As used herein, technical terms and scientific terms have the general meaning understood by those skilled in the art to which the present invention pertains unless otherwise defined, and a description for the known function and configuration unnecessarily obscuring the gist of the present invention will be omitted in the following description and the accompanying drawings.

Numerical ranges used herein include a lower limit, an upper limit, and all values within that range, increments that are logically derived from the type and width of the defined range, all double-defined values, and all possible combinations of upper and lower limits of numerical ranges defined in different forms. Unless otherwise defined herein, values outside the numerical range that may arise due to experimental errors or rounded values are also included in the defined numerical range.

The term "comprise" mentioned herein is an "open" description having the meaning equivalent to expressions such as "include," "contain," "have," "feature", and does not exclude elements, materials, or process that are not further listed.

As used herein, the singular form of terms may be interpreted as including the plural form unless otherwise indicated.

The unit of % used herein refers to % by weight unless otherwise specified.

The term "Neck-in" mentioned herein may refer to a difference between a die width and a discharge width in a manufactured product. Unless otherwise defined, the "neck-in" value may be measured at a take-up speed of 440 feet/min, which produces a 1 mm coating thickness using a Black-Clawson extruded coating machine with a diameter of 3.5 inches and L/D of 30:1 and having a die that is deckled to 24 inches and has a width of 30 inches at an extrusion rate of 250 lbs/hour and a temperature of 600° F. and a die gap of 25 mm.

The term "draw down" mentioned herein refers to a take-up speed at which the molten polymer is destroyed from the die or a rate at which edge instability appears.

The term "melt tension (melt strength)" mentioned herein may refer to the force required to stretch the molten extrudate above the melting point at a take-up speed at which the melt tension reaches a stable level before the fracture rate when passing through the die of a standard plastometer, such as those described in ASTM D1238-E. Such melt tension may be expressed in units of centi-Newton (cN) or milli-Newton (mN), and unless otherwise defined, may be measured by Gottfert Rheotens. As a specific example, the melt tension may be a value measured when the force applied to the strand converges while increasing the rotational speed of the gear wheel from an initial linear speed of 11.2 mm/s to the acceleration of 2.4 mm/sect so that the strand discharged at 160° C. is caught on the gear wheel of the Rheotens device.

Conventionally, in the production of ethylene-acrylic acid copolymer, due to the neck-in phenomenon, workability, processability, and moldability were poor, and adhesive properties and melt tension were low. Until now, as a solution for this, the only practical means was to replace the acrylic acid comonomer with another type of comonomer. Accordingly, an object of the present invention is to provide a method for producing an ethylene-acrylic acid copolymer having high adhesive properties and melt tension compared to the prior art, and improved workability, processability, and moldability.

As a means for this, a method for producing an ethylene-acrylic acid copolymer according to the present invention includes: a polymerization step of preparing an ethylene-acrylic acid copolymer by copolymerizing an ethylene monomer and an acrylic acid comonomer; and a discharging step of discharging the ethylene-acrylic acid copolymer to obtain a strand, wherein in the discharging step, a discharging temperature of the strand is controlled to be 200 to 300° C., preferably 250 to 300° C., and more preferably 270 to 300° C.

If the temperature of the strand is not controlled to be within the above-described discharge temperature range, as in the related art, there are problems in that the neck-in phenomenon is significantly generated, workability, processability, and moldability are deteriorated, melt tension is degraded, and it is not easy to adjust the required melt index (MI). Specifically, the ethylene-acrylic acid copolymer produced by polymerization of each monomer in the reactor of the polymerization step is transferred to the discharge device to be discharged through the die of the discharge device. Here, if the above-described discharge temperature range is not satisfied during discharging, as in the related art, there are problems in that the neck-in phenomenon is significantly generated, workability, processability, and moldability are deteriorated, melt tension is degraded, and it is not easy to adjust the required melt index (MI). When the strands stay at a temperature exceeding 300° C. during discharging, a thermal degradation reaction occurs and the polymer backbone is broken, thereby weakening the melt tension.

As described above, in the present invention, in the production of the ethylene-acrylic acid copolymer, the discharge temperature of the strand is controlled in the above-described temperature range, so various effects such as minimizing the neck-in phenomenon, improving workability, processability, and moldability, improving adhesive properties, and improving melt tension are implemented. Specifically, if the discharge temperature of the strand is controlled to be within the above-described temperature range, the carboxyl groups in the strand, that is, the polymer, undergo a dehydration reaction in the discharge step to form an anhydride structure. As the discharge temperature is controlled within the above-described temperature range, the copolymer produced in the polymerization step contains an anhydride structure in the discharge step, thereby significantly improving physical properties such as adhesion and physical properties related to workability such as melt tension. In particular, as in the related art, there was a limit that the neck-in phenomenon could not be improved under the conditions requiring higher melt tension. However, in the present invention, there is an effect that may greatly improve the neck-in phenomenon while having high melt tension through a simple method of simply controlling the discharge temperature. Therefore, the method for producing the copolymer according to the present invention is a very technically useful method through high melt tension and low neck-in phenomenon in producing the ethylene-acrylic acid copolymer.

As described above, in the method for producing an ethylene-acrylic acid copolymer according to the present invention, in the discharging step, the carboxyl groups in the strand undergo a dehydration reaction to form an anhydride structure, such that the strand obtained by discharging includes an anhydride structural unit, and the melt tension is significantly improved.

Here, in the discharging step, the residence time of the strand during discharging may be sufficient as long as the anhydride unit structure may be formed in an appropriate amount in the polymer to achieve the above-described effect, preferably in the range of 5 to 60 seconds, more preferably 10 to 50 seconds, even more preferably 15 to 40 seconds, and even still more preferably 15 to 30 seconds. If the residence time of the strand during discharging satisfies the above-described range, the carboxyl groups in the strand properly form an anhydride structure to implement high melt tension and minimize the neck-in phenomenon.

As described above, in the present invention, during the production of the ethylene-acrylic acid copolymer, in the discharging step, high melt tension and minimization of neck-in phenomenon may be implemented by controlling the discharging temperature during discharging of the strands to form an anhydride structural unit. On the other hand, in the case of an ethylene-based copolymer that does not use an acrylic acid comonomer, it is impossible to form an anhydride structural unit because the ethylene-based copolymer does not have a carboxyl group, and thus, the ethylene-based copolymer does not have high melt tension and the neck-in phenomenon is not minimized.

In the discharging step, the content of the anhydride structural unit of the strand obtained by discharging may be controlled by adjusting the discharging temperature and residence time, etc., and may be sufficient as long as the above-described effect may be implemented. As a preferred example, the ratio of the total number of anhydride structural units in the copolymer of the strand to the total number of carboxyl group structural units may be 0.0001 to 0.1:1, and preferably 0.0005 to 0.05:1.

The content of the ethylene-acrylic acid copolymer according to the present invention, that is, the acrylic acid contained in the strand produced through the discharging step is not particularly limited, but the acrylic acid content in the total weight of the copolymer is 1 to 30% by weight, preferably 3 to 25% by weight, and preferably 5 to 20% by weight.

The weight average molecular weight of the ethylene-acrylic acid copolymer according to the present invention, that is, the strand produced through the discharging step is not significantly limited, and may be, for example 30,000 to 200,000 g/mol, specifically 30,000 to 150,000 g/mol, more specifically 70,000 to 130,000 g/mol. In addition, a polydispersity index (PI) on of the strands produced through the discharging step is not particularly limited, but as an example, the weight average molecular weight/number average molecular weight (Mw/Mn) may be 4.5 to 15, preferably 5 to 10. However, this is only described as a preferred example, and the present invention is not construed as being limited thereto.

The ethylene-acrylic acid copolymer according to the present invention, that is, the strand obtained by discharging in the discharging step, has a melt tension (Gottfert Rheotens, 160° C., ASTM D1238-E) of 120 mN or more, specifically 120 to 200 mN, more preferably 130 mN or more, and specifically 130 to 200 mN.

The ethylene-acrylic acid copolymer according to the present invention, that is, the strand obtained by discharging in the discharging step may have a melt index (190° C./2.16 kg, ASTM D 1238) of 5 to 15, specifically 9 to 15.

The ethylene-acrylic acid copolymer according to the present invention, that is, the strand obtained by discharging in the discharging step has a neck-in (draw down speed of 440 feet/min) of 3.3 inches or less, preferably 3.0 inches or less, and a difference between the width of the die and the width of the discharge is significantly low, and the moldability and processability are excellent.

The method for producing an ethylene-acrylic acid copolymer according to the present invention may further include a pelletizing step after the discharging step. Pellets of a predetermined size may be obtained by further performing a pelletizing step of cutting the strand obtained in the discharging step to be suitable for use in processes such as molding and processing.

The above-described effect is implemented by performing the polymerization step before the discharging step, and the polymerization step may be performed through a general polymerization method of an ethylene-acrylic acid copolymer. Preferably, in the polymerization step, a polymerization means performed under high temperature and high pressure conditions is preferably used, and hereinafter, a high temperature and high pressure polymerization means will be described in detail.

The polymerization step according to an embodiment of the present invention may be performed through a polymerization apparatus including a supply unit(100) for supplying a compressed material formed by secondary compression of a mixture including a polar solvent and a monomer containing an ethylene monomer and an acrylic acid comonomer that is primarily compressed through a primary compressor(120), with a hyper compressor(140) to a reactor (200); and a circulation unit for filtering an unreacted residue separated from a discharge material discharged from the reactor(200) and supplying the unreacted residue to the front end of the primary compressor(120) or the hyper compressor(140). Here, "discharge material" refers to those discharged by performing the ethylene-acrylic acid polymerization reaction inside the reactor(200) in the process for producing the ethylene-acrylic acid copolymer, and may include the ethylene copolymer and unreacted residues. In addition, "unreacted residue" refers to the remaining materials except for the ethylene-acrylic acid copolymer in the process for producing the ethylene-acrylic acid copolymer, and specifically may include unreacted ethylene monomer, unreacted acrylic acid comonomer, solvent, initiator, other additives, etc.

Specifically, the supply unit(100) may include a first supply unit(110) and a second supply unit(130), the first supply unit(110) supplies ethylene monomer, and the second supply unit supplies acrylic acid comonomer. When describing a supply process of the reactant, the ethylene monomer supplied from the first supply unit(110) is compressed through the primary compressor(120) to produce a primary compressed material, and the mixture including the acrylic acid comonomer supplied from the second supply unit(130) and the primary compressed material is secondarily compressed by the hyper compressor(140) which is a secondary compressor to produce a secondary compressed material. The produced secondary compressed material is supplied to the reactor(200), and the ethylene monomer and acrylic acid comonomer in the secondary compressed material are copolymerized in the reactor(200) to synthesize an ethylene-acrylic acid copolymer.

That is, in the polymerization step, a reactant supply step in which a compressed material including a monomer, a comonomer, and a solvent compressed by the hyper compressor(140) is supplied to the reactor(200) through a supply line(10); and a reaction step in which the compressed material is reacted in the reactor(200) may be performed. As described above, the monomers and the solvent are supplied to the hyper compressor(140) through the supply unit(100) to prevent plugging of the hyper compressor(140).

In addition, the polymerization step further includes a first circulation step in which the discharge material discharged from the reactor(200) is filtered by a high pressure separator (310) and the separated unreacted residue is supplied to the front end of the hyper compressor(140) through a high pressure circulation line(30); and a second circulation step in which the material filtered from the high pressure separator (310) is secondarily filtered by a low pressure separator(320) and the separated unreacted residue is supplied to the front end of the primary compressor(120) through a low pressure circulation line(20). Such a step may be performed through the circulation unit. In the compressed material compressed in the hyper compressor(140) from the supply unit(100), unreacted monomers and solvents are re-supplied to the front end of the hyper compressor(140) or the primary compressor(120) through the circulation unit. Therefore, throughout the polymerization reaction, it is possible to produce an ethylene-acrylic acid copolymer with high efficiency while implementing the above-described effects.

Specifically, in the first circulation step, a filter unit(400) capable of filtering and separating unreacted residues may be provided to discharge impurities to the outside, and impurities other than unreacted residues may also be removed by filtration and separation. In addition, an additional line may be installed when plugging due to excessive impurities in the filter unit(400).

In addition, in the second circulation step, residual unreacted residue separated by secondary filtering of the discharge material from which the primary filtered unreacted residue is separated may be supplied to the primary compressor(120). That is, the polymerization step may further include supplying the residual unreacted residue separated by secondary filtering of the discharge material from which the unreacted residue is removed from the circulation unit to the front end of the primary compressor(120). Accordingly, as the solvent may be delivered up to the front end of the primary compressor(120) that supplies the ethylene monomer, the solvent is transported throughout the polymerization device, and plugging generation may be suppressed and various foreign substances remaining inside the manufacturing device may be removed.

The solvent may be any medium that allows the copolymerization of the ethylene monomer and the acrylic acid comonomer to occur, and may be, for example, a low-boiling polar solvent. In a specific example, the solvent may include any one or two or more selected from methyl alcohol, ethyl alcohol, isopropyl alcohol, methyl ethyl ketone, tetrahydrofuran, acetone, ethyl acetate, propyl acetate, butyl acetate, 2-methoxyethanol, and 2-ethoxyethanol. However, this is only described as a specific example, and the present invention is not construed as being limited thereto.

A mixing ratio of the ethylene monomer, the acrylic acid comonomer and the solvent may be appropriately controlled so that an ethylene-acrylic acid copolymer having an acrylic acid content in the above-described range may be prepared, and for example, it may be 1 to 20 parts by weight of the acrylic acid comonomer, 1 to 20 parts by weight of the solvent, specifically 3 to 10 parts by weight of the acrylic acid comonomer, and 3 to 10 parts by weight of the solvent based on 100 parts by weight of the ethylene monomer. However, this is only described as a specific example, and the present invention is not construed as being limited thereto.

In the polymerization step, as the polymerization may be polymerization by an initiator, for example, free radical polymerization, the compressed material supplied to the reactor(200) preferably further includes an initiator, specifically, a radical initiator, and polymerization may be performed by reacting each monomer under the radical initiator. As a preferred example, the polymerization may be preferably performed by an initiator mixed solution containing a radical initiator and a dilution solvent. The amount of the initiator used may be sufficient as long as it starts a radical polymerization reaction, and for example, may be used in an amount of 0.001 to 1 part by weight based on 100 parts by weight of the total monomer. In addition, the amount of the diluent solvent used may be appropriately adjusted, and for example, the diluent solvent may be diluted to 5 to 1,000 parts by weight based on 1 part by weight of the initiator. However, this is only described as a specific example, and the present invention is not construed as being limited thereto.

As a specific example, the type of the radical initiator may be any as long as the ethylene monomer and the acrylic acid comonomer may perform radical polymerization, and examples thereof include peroxy-based organic peroxides containing any one or two or more selected from peroxycarbonate, peroxydicarbonate, peroxyester and peroxyketal. However, this is only described as a specific example, and the present invention is not construed as being limited thereto.

As the dilution solvent, a known initiator dilution solvent may be used. For example, when a paraffin-based solvent, more preferably, Isopar-H among paraffin-based solvents is used as the dilution solvent, a homogeneous copolymer may be produced, quality deterioration such as molecular weight reduction may be prevented, and a product having a constant value such as excellent melt tension of the entire strand to be produced may be provided.

In an example of the present invention, the compressed material supplied to the reactor 200 may further include a chain transfer agent. As one non-limiting example of the chain transfer agent, aliphatic and olefinic hydrocarbons, for example, compounds such as saturated hydrocarbons having 6 or more carbon atoms, such as hexane, cyclohexane, or octane; ketone compounds such as acetone, diethyl ketone, or diamyl ketone; aldehyde compounds such as formaldehyde and acetaldehyde; and alcohol-based compounds such as methanol, ethanol, propanol or butanol may be used. When the chain transfer agent is used, the amount of the chain transfer agent used is not particularly limited, and may be used, for example, in an amount of 0.1 to 20 parts by weight based on 100 parts by weight of the total monomer. However, this is only described as a preferred example, and the present invention is not construed as being limited thereto.

As described above, the polymerization step is preferably performed under high temperature and high-pressure conditions through a compressor and/or temperature control. As a specific example, polymerization temperature and polymerization pressure may be more preferably carried out under polymerization conditions of 150 to 350° C. and 1,000 to 5,000 bar, preferably 200 to 300° C. and 1,200 to 3,000 bar, respectively in terms of better implementing the above-described effects.

As the reactor 200 used in the polymerization step, any known reactor for the polymerization reaction may be used. As examples of the reactor 200, a variety of reactors such as a batch reactor such as an autoclave, a continuous stirred tank reactor (CSTR), a tubular reactor, etc. may be used.

FIG. 1 illustrates a producing process diagram of an ethylene-acrylic acid copolymer according to an exemplary embodiment of the present invention. Hereinafter, the polymerization process of the polymerization step will be described in detail with reference to FIG. 1.

Referring to FIG. 1, in order to perform the polymerization step, a polymerization apparatus for producing an ethylene-acrylic acid copolymer may be used. The polymerization apparatus may include a primary compressor(120) for primary compression of ethylene supplied from the first supply unit(110); a hyper compressor(140) for secondary compression of a mixture including primary compressed ethylene, a comonomer containing carboxylic acid supplied from the second supply unit(130), and a polar solvent; a supply line(10) for supplying the compressed material compressed from the hyper compressor(140) to a reactor(200); a high pressure separator(310) for separating unreacted residues obtained by primary filtering the discharge material discharged from the reactor(200); and a high pressure circulation line(30) for supplying the unreacted residue separated from the high pressure separator(310) to the front end of the hyper compressor(140).

In an example of the present invention, the primary compressor(120), the hyper compressor(140), the reactor (200) (Autoclave Reactor), the high pressure separator(310) (HPS), and a low pressure separator(320) (LPS) may use a conventionally known apparatus for producing ethylene-based polymer.

In one aspect of the present invention, the apparatus for producing an ethylene-based polymer may further include a filter unit(400) positioned at the rear end of the high pressure circulation line(30) and capable of filtering and removing impurities. The remaining impurities except for unreacted monomers and solvents are removed from the filter unit (400) through the high pressure circulation line(30), and the unreacted residue containing the unreacted monomer and solvent from which impurities have been removed is transferred to the front end of the hyper compressor(140).

In one aspect of the present invention, the apparatus for producing an ethylene-based polymer may further include a low pressure separator(320) for discharging the ethylene-acrylic acid copolymer formed by separating the residual unreacted residues obtained by secondarily filtering the discharge material from which the unreacted residues are separated in the high pressure separator(310); and a low pressure circulation line(20) for supplying the unreacted residue separated in the low pressure separator(320) to the front end of the primary compressor(120). As described above, the low pressure separator(320) and the low pressure circulation line(20) remove unreacted residues again to enable the production of a high-purity ethylene-acrylic acid copolymer. In addition, as unreacted residues containing ethylene and a polar solvent are supplied to the primary compressor(120) side, high process efficiency may be achieved.

EXPERIMENTAL METHOD

Example 1

As illustrated in FIG. 1, an ethylene monomer subjected to primary compression in a primary compressor at a temperature of 30° C. and a pressure of 200 bar was supplied to a secondary compressor at an average flow rate of 3 m$^3$/min, and a mixture of acrylic acid comonomer and ethyl acetate in a weight ratio of 10:1 was supplied to the secondary compressor at an average flow rate of 0.004 m$^3$/min. Then, a second pressure was applied to the second compressor at a temperature of 20° C. and a pressure of 200 bar to form a compressed material. The compressed material and the initiator mixed solution supplied from the secondary compressor were supplied to the reactor at an average flow rate of 0.4 m$^3$/min, and the inside of the reactor was adjusted to a temperature of 250° C. and a pressure of 2,250 bar to induce a polymerization reaction. Here, as an initiator mixed solution, a dilution solvent (Isopar-H, Exxonmobil Co., Ltd.) in which the initiator (tert-Butyl peroxyacetate) was diluted to 10% by weight was used. Then, the discharge material discharged from the reactor was supplied to the high pressure separator at an average flow rate of 1.3 m$^3$/min. The unreacted residues separated by the high pressure separator were re-supplied to the secondary compressor at an average flow rate of 1.4 m$^3$/min through a circulation line, and the discharge material from which the unreacted residues are primarily removed by the high pressure separator was supplied to a low pressure separator to secondarily remove unreacted residues. The unreacted residues removed from the low pressure separator were re-supplied to the primary compressor at an average flow rate of 5.0 m$^3$/min, and an ethylene-acrylic acid copolymer having an acrylic acid content of 9.7% by weight from which unreacted residues were removed in the low pressure separator was produced.

Then, the ethylene-acrylic acid copolymer was transferred to a discharging device, and the ethylene-acrylic acid copolymer was discharged from the die of the discharging device to obtain a strand. Here, the ambient temperature of the device was 25° C., and the temperature of the strands during discharging and the residence time during discharging were controlled to maintain 280° C. and 22 seconds, respectively.

Then, the acrylic acid content of the ethylene-acrylic acid copolymer strand, the controlled temperature during discharging, the residence time during discharging, the melt tension, the melt index (MI), and the neck-in of the strand were measured. The measured values are shown in Table 1 below. Here, the value of melt tension was tested according to ASTM D1238-E standard. Specifically, after mounting the Rheotens (gottfert) equipment at the lower end of the discharging device and hanging the strand discharged from the discharging device at a distance of 0.5 mm to the gear wheel of the device, it is calculated as a value at which the force applied to the strand converges by measuring the force applied to the strand while increasing the rotational speed from the initial rotational speed of 11.2 mm/sec$^2$ to 2.4 mm/sec$^2$ with a constant acceleration. In addition, the melt index was tested according to ASTM D 1238 standard. Specifically, the copolymer was put into a barrel with a diameter of 9.55 mm and a temperature of 190° C. using a Melt Index tester (MI tester, Gottfert), and the amount discharged for 10 minutes was measured by passing a capillary with a diameter of 2.095 mm by pressing with a weight of 2.16 kg was calculated.

Example 2

An ethylene-acrylic acid copolymer strand was obtained in the same manner as in Example 1, except that in Example 1, an ethylene-acrylic acid copolymer having an acrylic acid content of 8.0% by weight was produced by adjusting the flow rate of the monomer to satisfy the acrylic acid content of Table 1 below.

Example 3

An ethylene-acrylic acid copolymer strand was obtained in the same manner as in Example 1, except that in Example 1, the residence time during discharging was 4 seconds.

Comparative Example 1

An ethylene-acrylic acid copolymer strand was obtained in the same manner as in Example 1, except that in Example 1, the temperature of the strands was not controlled. Here, the temperature of the uncontrolled strand was 190° C.

Comparative Example 2

An ethylene-acrylic acid copolymer strand was obtained in the same manner as in Example 1, except that in Example 1, methyl acrylate was used instead of acrylic acid as a comonomer.

TABLE 1

|  | Example | | | Comparative Example | |
|---|---|---|---|---|---|
|  | 1 | 2 | 3 | 1 | 2 |
| Discharging temperature (° C.) | 280 | 275 | 280 | 190 | 250 |
| Residence time (sec) | 22 | 22 | 4 | 20 | 22 |
| Comonomer Type | Acrylic acid | Acrylic acid | Acrylic acid | Acrylic acid | Methyl acrylate |
| Content | 9.7 | 8 | 9.7 | 9.7 | 20 |
| MI (g/10 min, 2.16 kg) | 11.0 | 9.8 | 11.9 | 12.3 | 8.4 |
| Melt tension (mN) | 149 | 132 | 113 | 108 | 110 |
| Neck-in(inch) (draw down speed of 440 feet/min) | 2.5 | 2.8 | 3.4 | 3.5 | 3.6 |

DETAILED DESCRIPTION OF MAIN ELEMENTS

100: Supply unit
110: Primary supply unit
120: Primary compressor
130: Secondary supply unit
140: Hyper compressor (secondary compressor)
200: Reactor
310: High pressure separator
320: Low pressure separator
400: Filter
10: Supply line
20: Low pressure circulation line
30: High pressure circulation line
A: Ethylene-acrylic acid copolymer
B: Impurity

What is claimed is:

1. A method for producing an ethylene-acrylic acid copolymer comprising an anhydride structural unit, the method comprising:
    a polymerization step of preparing an ethylene-acrylic acid copolymer by copolymerizing an ethylene monomer and an acrylic acid comonomer; and
    a discharging step of discharging the ethylene-acrylic acid copolymer to obtain a strand;
    wherein in the discharging step, a discharging temperature of the strand is controlled to be 275 to 280° C.;
    the residence time of the strand is 5 to 60 seconds; and
    wherein in the discharge step, carboxyl groups in the strand are dehydrated to form the anhydride structural unit.

2. The method of claim 1, wherein the strand has an acrylic acid content of 1 to 30% by weight.

3. The method of claim 1, wherein the strand has a weight average molecular weight/number average molecular weight ($M_w/M_n$) of 4.5 to 15.

4. The method of claim 1, wherein in the polymerization step, a polymerization temperature and a polymerization pressure are 150 to 350° C. and 1,000 to 5,000 bar, respectively.

5. The method of claim 1, wherein in the polymerization step, polymerization is carried out with an initiator in Isopar-H solvent.

6. The method of claim 1, wherein in the discharging step, the strand obtained by discharging has a melt tension (Gottfert Rheotens, 160° C., ASTM D1238-E) of 120 to 200 mN.

7. The method of claim 1, wherein in the discharging step, the strand obtained by discharging has a melt index (190° C./2.16 kg, ASTM D 1238) of 5 to 15.

8. The method of claim 1, wherein in the discharging step, the strand obtained by discharging has a neck-in (draw down speed of 440 feet/min) of 3.3 inches or less.

9. The method of claim 1, wherein residual, unreacted residues are separated from the ethylene-acrylic acid copolymer prior to the discharge step.

10. The method of claim 1, wherein a total number of anhydride structures in the strand to the total number of carboxyl group structural units in the strand is 0.0001 to 0.1:1.

* * * * *